March 26, 1935.    H. W. LORD    1,995,890
COUNTING APPARATUS
Filed Aug. 19, 1932
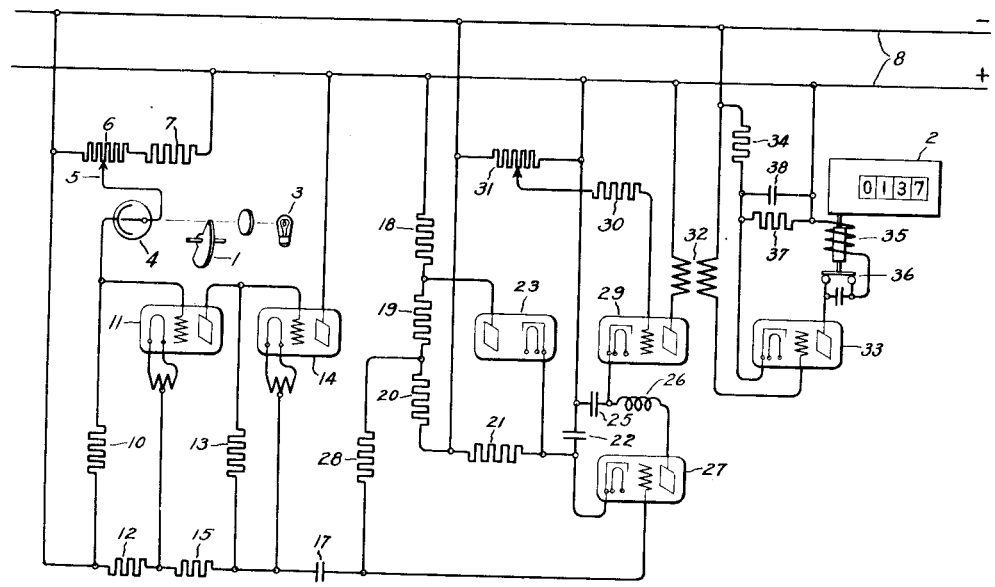
Inventor:
Harold W. Lord,
by Charles E. Mullan
His Attorney.

Patented Mar. 26, 1935

1,995,890

UNITED STATES PATENT OFFICE 1,995,890

COUNTING APPARATUS

Harold W. Lord, Schenectady, N. Y., assignor to General Electric Company, a corporation of New York Application August 19, 1932, Serial No. 629,467

5 Claims. (Cl. 250—41.5)

My invention relates to counting apparatus and particularly to counting apparatus by which use is made of some commercial form of counter for obtaining the total of the things or events to be counted. While such counters usually may be operated to count as slowly or infrequently as desired, the rapidity at which they may be operated is limited, and hence they are not adapted for many uses where high speed counting is required. It is an object of my invention to provide an improved counting apparatus with which a commercial form of counter may be employed for determining the number of things or events whose rapidity of occurrence is above that for which the counter is adapted to or capable of operating. A further object of my invention is the provision of such counting apparatus which, without modification, may be employed for accurately counting where the rapidity of operation of the counter covers a wide range including both high and low speed operation. It may be stated at this point, by way of example, that with apparatus such as I am about to describe, I have accurately counted impulses occurring at a variable rapidity ranging from 2 to 3600 per minute. These figures, however, are merely illustrative and are not to be taken as the limits of the apparatus in either direction.

In carrying out my invention I produce an electrical impulse for each thing or event to be counted, and provide means for storing up successive impulses. When the total amount of stored energy reaches a predetermined value, it is automatically released and is then effective to cause the actuation of a commercial or relatively low speed counter. By knowing the number of impulses necessary to bring the total amount of stored energy to the point where it is released one needs merely to multiply the reading of the counter by that number to obtain the correct count of the things being counted.

My invention will be better understood from the following description taken in connection with the accompanying drawing, and its scope will be pointed out in the appended claims.

In the single figure of the drawing which is a circuit diagram illustrating one embodiment of my invention I have shown, by way of example, a rotatable member 1 whose total number of rotations or whose rotations per unit of time it is desired to know but the rapidity of whose rotations, at least at certain times, may be too high to be counted by the counter 2. The member 1 is represented for convenience of illustration as semicircular and arranged in the path of a beam of light from the source 3 to the photoelectric device 4, which in the present case is represented as a photo-electric tube. The anode of the tube connects with the arm 5 of the potentiometer 6 whose resistance, for example, may be 2500 ohms and which connects in series with the resistor 7 whose resistance, for example, may be 6000 ohms, across the direct current supply circuit 8, which for example may be at 350 volts. The cathode of device 4 connects through the resistor 10, which for example may be 10 megohms, with the negative side of the supply circuit. The cathode of device 4 also connects with the grid of the electron discharge device 11 which with the electron discharge device 14 comprises a regenerative amplifier. The cathode of device 11 connects through resistor 12, which for example may be 500 ohms, with the negative side of the supply circuit, and the anode of this device connects through resistor 13, which for example may be 1 megohm, with the cathode of electron discharge device 14, resistor 15, which for example may be 10,000 ohms, being arranged between the cathodes of these two devices. The anode of device 11 also connects with the grid of device 14 and the anode of device 14 connects directly with the plus side of the supply circuit. Devices 11 and 14 constitute a regenerative direct current amplifier, device 11 being of relatively higher impedance than device 14.

With light falling on the photo tube, device 11 has a low negative bias or possibly a positive bias. This makes the internal plate resistance of 11 low and puts a high negative bias on device 14 causing a high internal resistance in 14. Thus the current through resistors 12 and 15 is small and there is only a low voltage across these two resistors. Now if the light beam be cut off either slowly or rapidly the bias on 11 is made more negative and that in turn makes the bias on 14 less negative and permits more current to flow through the resistors 12 and 15. This increased current increases the bias on 11 in addition to that caused by reducing the light falling on the photo cell, thus producing a regenerative effect. With proper adjustment of the circuit constants a sufficient regenerative effect is produced that at some critical value of light the current through 14 suddenly increases to some value several times its former value thus causing a high voltage drop across the resistors 12 and 15. The sudden increase in voltage across those resistors is impressed on resistor 28, which for example may be 50,000 ohms, through the capacitor 17, which for example may be 0.1 mf., causing a positive transient voltage surge to appear across resistor 28. This transient voltage is made of sufficient amplitude to overcome the bias on device 27 (to be described later) and of a sufficiently short duration to have 27 biased off again before capacitor 22 (also to be described later) is fully recharged from source 8. Increasing the light on the photo cell to some higher critical value of light causes the current through resistors 12 and 15 to suddenly drop to its low former value and a negative transient voltage surge is impressed across resistor 28.

In order to understand better the purpose of the aforementioned positive surge we shall now consider for the time being the circuit containing the capacitor by which the effect of a number of light impulses is temporarily stored up. Bridged across the supply circuit 8 is the voltage divider comprising the three resistors 18, 19 and 20 whose values, for example, may be respectively 2500 ohms, 700 ohms, and 500 ohms. Also connected across the supply circuit 8 through resistor 21 whose resistance may, for example, be 10,000 ohms, is the secondary capacitor 22, whose capacity, for example, may be 1 mf. In order to limit the amount of charge taken by capacitor 22 I employ the two-element vapor electric discharge device 23 between this capacitor and a point between resistors 18 and 19. This device 23, which it will be noted is rectifying in operation, is constructed to break down when the charge of capacitor 22 has reached a predetermined fraction of full value, the charge of this capacitor being thereby limited substantially to that value. Connected across capacitor 22 is a circuit including the relatively large main capacitor 25, which for example, may have a capacity of 14 mfs., the reactor 26 and the anode circuit of the arc or vapor electric discharge device 27, the grid of the latter being connected with the capacitor 17 and also with the resistor 28. The grip of device 27 therefore is affected by the aforementioned positive surges which pass the capacitor 17 and in response to each allows the charge or a portion thereof in capacitor 22 to flow into capacitor 25. Thus successive charge increments are added to capacitor 25 from capacitor 22 until the potentials across the respective capacitors are substantially the same. Because of the inductance of reactor 26, capacitor 22 continues to discharge into capacitor 25 even after the potentials across the two capacitors have equalized, whereby at the end of the discharge period the potential across capacitor 22 is somewhat less than that across capacitor 25. This makes the anode of device 27 negative with respect to the cathode thereof for a short time and commutates the device thus stopping the flow of current in the discharge circuit. When the potential across capacitor 25 reaches a definite value the accumulated charge of the capacitor is allowed suddenly to discharge and effect an actuation of the counter 2. Control of the discharge of capacitor 25 is through the arc or vapor electric discharge device 29, whose control grid connects through the resistor 30, which, for example, may be 50,000 ohms, and the potentiometer 31, whose total resistance, for example, may be 20,000 ohms, the latter bridging the supply circuit 8. In the anode circuit of device 29 is the primary of the transformer 32. Since the grid potential of device 29 is fixed by the position of the arm of the potentiometer 31, it will be seen that as the total charge of capacitor 25 is increased by the successive increments of charge from capacitor 22 eventually a point will be reached where the grid-cathode potential of device 29 will reach the critical grid potential thereof and device 29 will begin to conduct current, thus allowing capacitor 25 to discharge through the primary of transformer 32. The inductance of the transformer operates to commutate device 29 in a manner similar to that previously explained in connection with reactor 26 and device 27. Since the secondary of the transformer 32 connects with the grid of the vapor electric discharge device 33, the impulse due to the sudden current flow in the anode circuit of the device 29 will trip device 33 and cause it to conduct. This latter device has its cathode connected with the negative side of the line through resistor 34 which, for example, may be 50 ohms, and has its anode circuit connected with the positive side of the line through the solenoid 35 by which the counter 2 is actuated. In series also with the anode circuit is the switch 36 which in the form shown is operated by the core of the solenoid 35, this switch being used to open the anode circuit after each actuation of the counter. Bridged across the solenoid and device 33 are the resistor 37 which may, for example, be of 250 ohms, and the capacitor 38 which, for example, may be 7 mfs. The latter capacitor serves to supply part of the energy taken by the solenoid and thus relieves the supply circuit of excessive load.

The operation of the above described apparatus is as follows: At each turn of the member 1 the illumination of the photo device 4 is decreased, the apparatus being operative whether the change is sudden or gradual. The corresponding increase in resistance of the device operates through the regenerative amplifier comprising discharge devices 11 and 14 to produce a surge which passes the capacitor 17. This surge acting on the grid of the vapor electric device 27 causes this device to pass current whereby the charge on capacitor 22 or a part thereof is delivered as an increment of charge to the capacitor 25, the presence of reactor 26 causing capacitor 22 to deliver somewhat more of its charge than would otherwise be the case. Since capacitor 25 is relatively large it will receive a number of such increments of charge from capacitor 22. The latter capacitor, it will be noted, is automatically recharged to a predetermined value at which device 23 begins to break down after each operation of device 27. When capacitor 25 has finally received a total charge such that the critical grid voltage of device 29 is reached, this device breaks down whereby the charge accumulated in capacitor 25 flows as an impulse through the primary winding of transformer 32, the inductance of the transformer effecting a complete discharge of the capacitor even to reversing the polarity thereof, and commutating device 29. This impulse is transmitted to the secondary of transformer 32 and trips the discharge device 33 whence the solenoid 35 is energized to operate the counter 2 and also open the circuit thereof to stop the operation of device 33. By adjusting the position of the arm of potentiometer 31 device 29 can be caused to operate after any desired number of increments of charge received by the capacitor 25 from capacitor 22. Knowing the number of such increments one needs merely to multiply the count shown by the counter 2 by this number in order to obtain the total number of light interruptions or rotations of the member 1.

An important feature of the above described arrangement which facilitates the high speeds obtainable therewith is the connection of capacitor 22 in series with resistor 21 across the source of supply and the use of the electron discharge device 23 to limit the charge taken by the capacitor. As a result capacitor 22 after each discharge thereof recharges at a high rate, namely that governed by the supply potential but as soon as the charge thereof reaches a predetermined value, such for example as 0.632 of the potential of the supply, the device 23 breaks down and consequently limits the charge taken by the capacitor. The device 23 continues to pass current holding the charge on the capacitor to the predetermined value until the capacitor is allowed to discharge into capacitor 25.

In certain cases I may dispense with the transformer 32, device 33 and switch 36 and connect the solenoid of the counter directly in the anode circuit of device 29 thus causing the current discharged by capacitor 25 to energize the counter solenoid.

It will be noted that the surge which is produced in response to each diminution of light reaching the photo tube and which trips the device 27 to cause an increment of charge to be given capacitor 25 is substantially independent of the speed of the rotatable member 1. While the time of occurrence of the surges is controlled by the intensity of the light reaching the tube the intensity of the surges is uniform and is controlled solely by the regenerative amplifier including devices 11 and 14. The apparatus therefore is well adapted and without alteration or adjustment for counting at speeds ranging from very low to very high, the latter being far beyond that of the counter used alone or prior to my invention.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. Counting apparatus comprising a main and a secondary capacitor, means for charging the secondary capacitor, a photo-electric device arranged to receive rapid intermittent variations in light whose total number is to be determined, means controlled by the device and responsive to each variation in light for transferring a charge increment from the secondary capacitor to the main capacitor, a counter and means responsive to each successive total charge of the main capacitor corresponding to a predetermined number of charge increments for causing the discharge of the main capacitor and a single actuation of said counter.

2. Counting apparatus comprising a source of current supply, a first capacitor connected to be charged to the potential difference of said supply, means for limiting the charge of the capacitor to a predetermined fraction of the full charge thereof, a second capacitor, means responsive to the things whose total number is to be determined for transferring charges from the first capacitor to the second capacitor, a counter and means responsive to a predetermined charge of said second capacitor for causing an actuation of said counter.

3. Apparatus by which the total number of a series of electrical impulses may be determined comprising a counter, means comprising regenerative electron discharge apparatus for producing a surge in response to each impulse, the intensity of said surges being uniform and substantially independent of the wave form of said impulses and means responsive to said surges for actuating said counter.

4. Apparatus by which the total number of a series of light variations may be determined comprising a counter, a photo-electric device responsive to said variations, a regenerative electron discharge amplifier having its input circuit connected with said device for producing surges of uniform intensity and substantially independent of the rate of light variation and means for producing a single actuation of the counter in response to a plurality of successive surges.

5. Apparatus by which the total number of a series of light variations may be determined comprising a counter, means for producing surges of uniform intensity in response to the respective light variations comprising a photo-electric device arranged to receive said light, a regenerative amplifier including a plurality of interconnected electron discharge devices controlled by said photo-electric device means for storing up energy in response to each surge and means whereby the stored energy corresponding to a predetermined number of surges produces an actuation of said counter.

HAROLD W. LORD.